(12) United States Patent
Pavlidis et al.

(10) Patent No.: US 9,213,996 B2
(45) Date of Patent: Dec. 15, 2015

(54) SYSTEM AND METHOD FOR ANALYZING SOCIAL MEDIA TRENDS

(71) Applicant: Wal-Mart Stores, Inc., Bentonville, AR (US)

(72) Inventors: Ioannis Pavlidis, Boulder, CO (US); Tracy Chu, Mountain View, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 374 days.

(21) Appl. No.: 13/681,312

(22) Filed: Nov. 19, 2012

(65) Prior Publication Data

US 2014/0143405 A1    May 22, 2014

(51) Int. Cl.
| | |
|---|---|
| G06F 15/173 | (2006.01) |
| G06Q 50/00 | (2012.01) |
| G06Q 30/02 | (2012.01) |
| H04L 12/18 | (2006.01) |

(52) U.S. Cl.
CPC ............ *G06Q 50/01* (2013.01); *G06Q 30/0201* (2013.01); *G06Q 30/0202* (2013.01); *H04L 12/1813* (2013.01)

(58) Field of Classification Search
CPC .............. G06Q 50/01; G06Q 30/0202; G06Q 30/0201; H04L 12/588; H04L 12/1813
USPC ............... 709/207, 219, 224, 231; 706/45–46
See application file for complete search history.

(56) References Cited

U.S. PATENT DOCUMENTS

| | | | |
|---|---|---|---|
| 7,720,835 B2 | 5/2010 | Ward | |
| 8,291,016 B1 | 10/2012 | Whitney | |
| 8,375,024 B2 | 2/2013 | Goeldi | |
| 2002/0103695 A1 | 8/2002 | Urken | |
| 2006/0184464 A1 | 8/2006 | Tseng | |
| 2007/0112637 A1 | 5/2007 | So | |
| 2010/0119053 A1 | 5/2010 | Goeldi | |
| 2011/0047013 A1 | 2/2011 | Mckenzie | |
| 2011/0106589 A1 | 5/2011 | Blomberg | |
| 2011/0125550 A1 | 5/2011 | Erhart | |
| 2011/0125697 A1 | 5/2011 | Erhart | |
| 2011/0125793 A1 | 5/2011 | Erhart | |
| 2011/0125826 A1 | 5/2011 | Erhart | |
| 2012/0005224 A1* | 1/2012 | Ahrens et al. | 707/769 |
| 2012/0036085 A1 | 2/2012 | Srivastava | |
| 2012/0102021 A1 | 4/2012 | Hill | |
| 2012/0117059 A1 | 5/2012 | Bailey | |
| 2012/0143815 A1 | 6/2012 | Lozano | |
| 2012/0185544 A1* | 7/2012 | Chang et al. | 709/206 |
| 2012/0203584 A1 | 8/2012 | Mishor | |
| 2012/0226748 A1* | 9/2012 | Bosworth et al. | 709/204 |
| 2012/0296967 A1* | 11/2012 | Tao et al. | 709/204 |
| 2013/0024290 A1 | 1/2013 | Berg | |

FOREIGN PATENT DOCUMENTS

| | | |
|---|---|---|
| WO | WO2012166150 A1 | 12/2012 |
| WO | WO2012171073 A1 | 12/2012 |
| WO | WO2013120160 A1 | 8/2013 |

* cited by examiner

*Primary Examiner* — Hieu Hoang
*Assistant Examiner* — Nam Tran
(74) *Attorney, Agent, or Firm* — Bryan Cave

(57) ABSTRACT

Disclosed are methods for identifying topical experts from a seed set of experts by identifying "second tier" influencers for the topic. New concepts detected among a pool of experts and second tier influencers are monitored among the general population and their significance evaluated. Reports may be generated for these detected trends. Trends in social media for a concept represented in a taxonomy may be detected by monitoring content for descendent nodes for the concept. Correlations between social media activity with respect to the concept and sales of products corresponding to the concept may be made and sales predicted for the same or different products that correspond to descendants of the concept in the taxonomy.

18 Claims, 6 Drawing Sheets

SYSTEM AND METHOD FOR ANALYZING SOCIAL MEDIA TRENDS

RELATED U.S. APPLICATION

This application is related to U.S. application Ser. No. 13/681,300, filed Nov. 19, 2012. The application is incorporated herein by reference for all purposes.

BACKGROUND

1. Field of the Invention

This invention relates to systems and methods for detecting and using social media trends.

2. Background of the Invention

Social media enables an unlimited number of people to comment on any conceivable subject. The volume of content generated and shared on any of the multiple social media sites during a single day is enormous. It can be difficult to make use of the market intelligence that might be gained from all of the commentary and opinion shared on such sites. For example, with such a large volume of content how are the beginnings of trends discerned from "noise" that is of no concern?

Accordingly it would be an advancement in the art to provide an intelligent means for detecting trends and making use of them from social media content notwithstanding the large volume of social media content generated by the users of the various social media sites.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
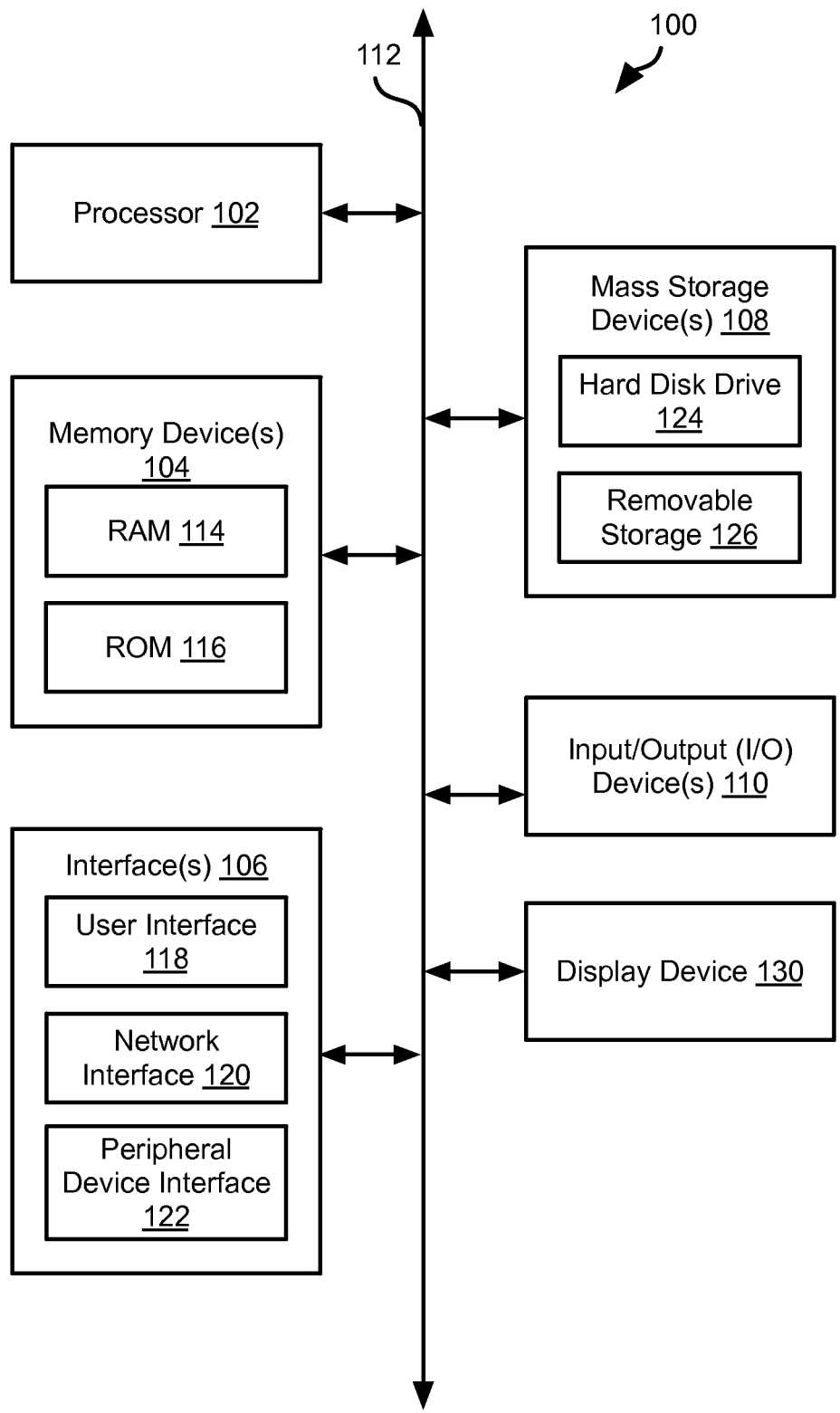
FIG. 1 is a schematic block diagram of an example computer system.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide systems and methods to identify trends in social media content and identify correlations with sales data.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
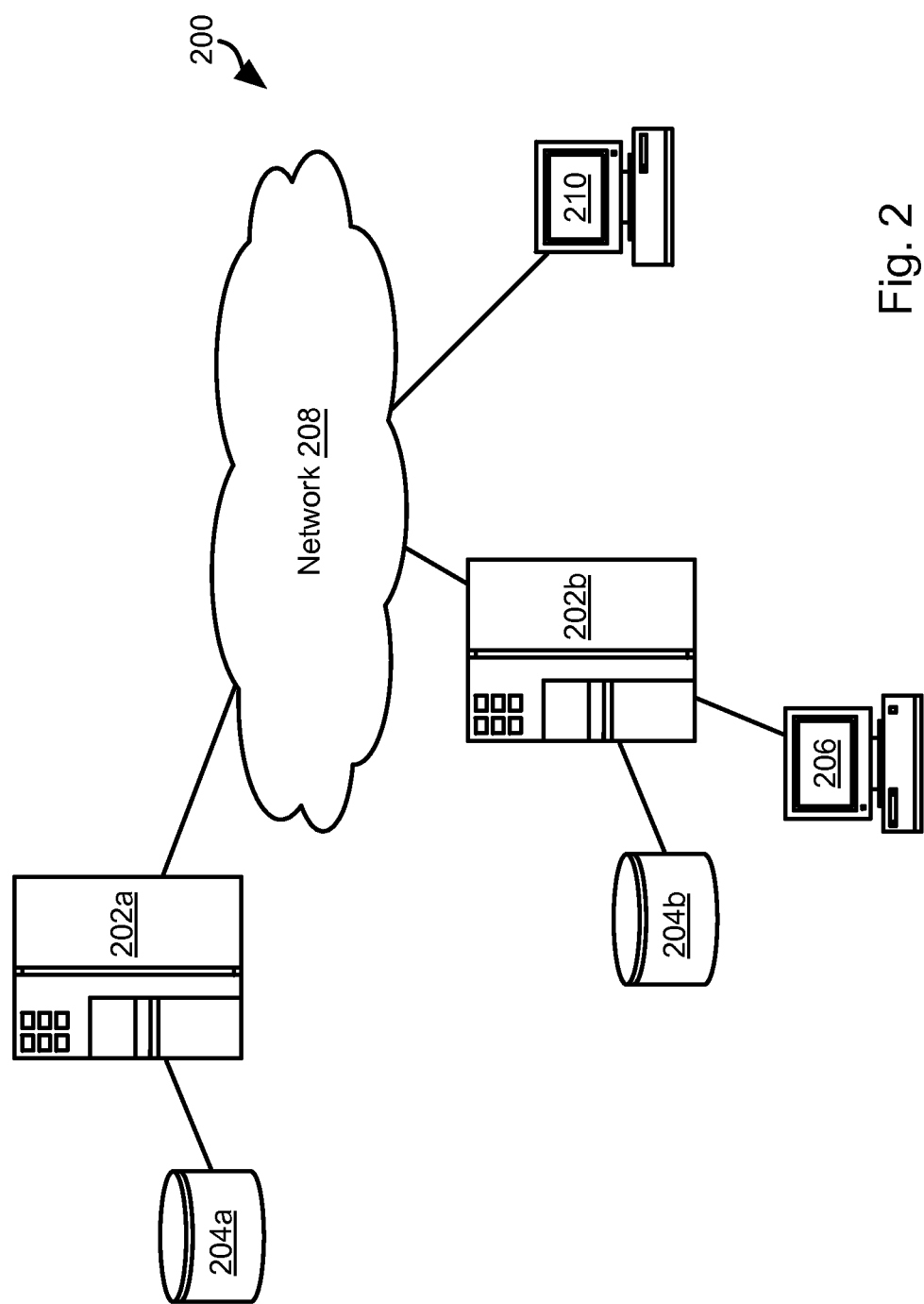
FIG. 2 is a schematic block diagram of an example network environment.

FIG. 2 illustrates an example of a computing environment 200 suitable for implementing the methods disclosed herein. In some embodiments, a server 202a provides access to a database 204a in data communication therewith. The database 204a may store social media information such as a user profile as well as a list of other user profiles of friends and associates associated with the user profile. The database 204a may additionally store postings made by the user associated with the user profile. The social media information hosted by the database 204a may correspond to social media such as Facebook™, Pinterest™, Twitter™, Foursquare™, LinkedIn™, or the like. The server 202a may provide access to the database 204a to users associated with the user profiles and/or to others. For example, the server 202a may implement a web server for receiving requests for data stored in the database 204a and formatting requested information into web pages. The web server may additionally be operable to receive information and store the information in the database 204a.

A server 202b may be associated with a merchant or by another entity providing services in accordance with methods described herein. The server 202b may be in data communication with a database 204b. The database 204b may store information regarding various products. In particular, information for a product may include a name, description, categorization, reviews, comments, price, past transaction data, promotions, and the like. The server 202b may analyze this data as well as data retrieved from the database 204a in order to perform methods as described herein. An operator may access the server 202b by means of a workstation 206, that may be embodied as any general purpose computer, tablet computer, smart phone, or the like.

The server 202a and server 202b may communicate with one another over a network 208 such as the Internet or some other local area network (LAN), wide area network (WAN), virtual private network (VPN), or other network. A user may access data and functionality provided by the servers 202a, 202b by means of a workstation 210 in data communication with the network 208. The workstation 210 may be embodied as a general purpose computer, tablet computer, smart phone or the like. For example, the workstation 210 may host a web browser for requesting web pages, displaying web pages, and receiving user interaction with web pages, and performing other functionality of a web browser. The workstation 210, workstation 206, servers 202a-202b, and databases 204a, 204b may have some or all of the attributes of the computing device 100.

Figure 3:
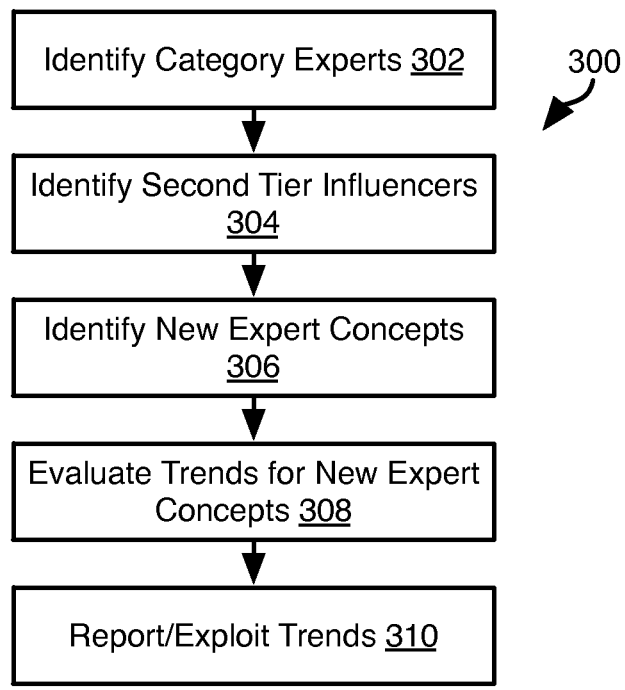
FIG. 3 is a process flow diagram of a method for detecting trends using an expert pool in accordance with an embodiment of the present invention.

FIG. 3 illustrates a method 300 for trend identification based on content generated by experts for a particular category. The method 300 may be executed with respect to a particular category. The category may be a node in a taxonomy, such as a product catalog or a reference corpus such as Wikipedia™. For example a category may include "health products," "hair care products," "cars," or the like. For the selected category, a seed set of experts for that category may be identified 302. Identifying 302 the seed set may be performed by a user or include retrieving a precompiled list of experts. The identified seed set may be represented by user identifiers for one or more social media site to which the experts of the seed set contribute content. For example, a Twitter™ "handle" or a user name for Facebook™' or some other site, may be used for each expert in the seed set.

Social media activity with respect to the seed set may be evaluated to identify 304 second tier influencers. Second tier influencers may be defined as those users that have a great deal of influence among social media users with respect to content generated by the seed set. A second tier influencer may be identified according to various metrics such as, a number of postings of the seed set reposted or otherwise referenced by the user, a number of references to an expert in the seed set by the user, and a correspondence between subject matter posted by the user and subject matter posted by the seed set. Other metrics indicating influence (whether related to the selected category or not) and affinity to one or both of the members of the seed set and the subject matter of social media activity of the seed set may also be used. In particular, in some embodiments, separate metrics or classes of metrics may be used, one of which may be a measure of "influence" in a general sense. The measure of influence may use any algorithm known in the art to characterize a user's influence. As known in the art, many of such algorithms measure a number of followers or friends of a user, a number of repostings of a user's content, the timeliness of posting particular content, and other factors as a measure of influence.

The second class of metrics measures an affinity for the seed set and the subject matter posted by the seed set. For example, concepts may be extracted from social media activity of the seed set. Concepts in the social media activity of a user may also be extracted and overlap with the concepts extracted for the seed set may be compared. Where a high degree of overlap is found, greater affinity may be found. In some embodiments, a temporal affinity may also be used to characterize affinity of a user to the seed set, e.g., whether overlapping conceptual references of the user and seed set occur around the same time, e.g. shortly after the concept is referenced by one or more members of the seed set.

Activity users including a pool of users including one or both of the seed set and the second tier users may then be evaluated to identify 306 new concepts. Identifying 306 new concepts may include analyzing content in past social media activity and content in current social media activity for the pool of users. In particular, concepts may be extracted from postings on social media sites. Extracting concepts from the texts of postings, or documents referenced by postings, may be performed according to any method known in the art. For example, clustering and search techniques may be used to analyze ngrams and term distance in order to identify concepts. In some embodiments, concepts may be extracted from postings according to the methods disclosed in U.S. patent application Ser. No. 13/300,524, entitled "PROCESSING DATA FEEDS," filed Nov. 18, 2011, which is hereby incorporated herein by reference in its entirety.

Identifying 306 new concepts may include maintaining a record of all concepts referenced by the pool of users for all time or for a certain past window of time prior to a window of time that is considered "current." For example, postings from the last three days, or some other number of days, may be considered a current window and postings from the last six months excluding the last three days, or some other number of months, may be used to characterize past activity. Accordingly, concepts referenced in the past window may be compared to concepts referenced in the current window. Those concepts mentioned only in the current window may be flagged as new. In some embodiments, concepts with significantly higher frequency of use in the current window relative to the past window may also be flagged as "new" or otherwise of suitable for processing according to the methods described herein.

In some embodiments, new concepts may also be further classified as interesting or non-interesting based on one or more factors. For example, an authority of the user or users that introduced or reposted content relating to a new concept may be evaluated, with postings being made by users with greater authority being flagged as more likely to be interesting. A total number of users discussing the new concept may also be used to classify a concept as interesting or non-interesting, with more discussed topics being flagged as more likely to be interesting. A subset of those concepts that have relatively higher likelihood of being interesting may then be selected for further analysis.

Activity with respect to some or all of the concepts identified 306 as new may be monitored and trends with respect to some or all of the concepts may be evaluated 308. Where a subset of the new concepts are used, the concepts chosen may be chosen that have relatively more mentions overall, a larger frequency of mentions in current postings, a larger increase in frequency of mentions, a larger number of users discussing the concept in a given time window, or the like. In particular postings or documents referenced by postings may be evaluated to identify concepts and the frequency with which the new concepts are mentioned in a given time period (hour, day, week, etc.) may be calculated and stored.

The trends evaluated for some or all of the new concepts may then be reported 310 or otherwise exploited, such as according to methods described herein. The method 300 advantageously enables topical detection of trends and the detection of trends that is not dependent on a simple popularity metric, which might not indicate importance for concepts that are of particular importance to a group of consumers or to a given area of interest.

The illustrated method 300, and the following methods using trends identified using the method 300, may advantageously reduce the influence of "spam" postings due to the careful selection of experts and influencers in specific category areas. Accordingly, large volumes of postings that are automatically generated and are of little value are unlikely to have the proper associations with a category, expert for a category, or important influencers for a category.

Figure 4:
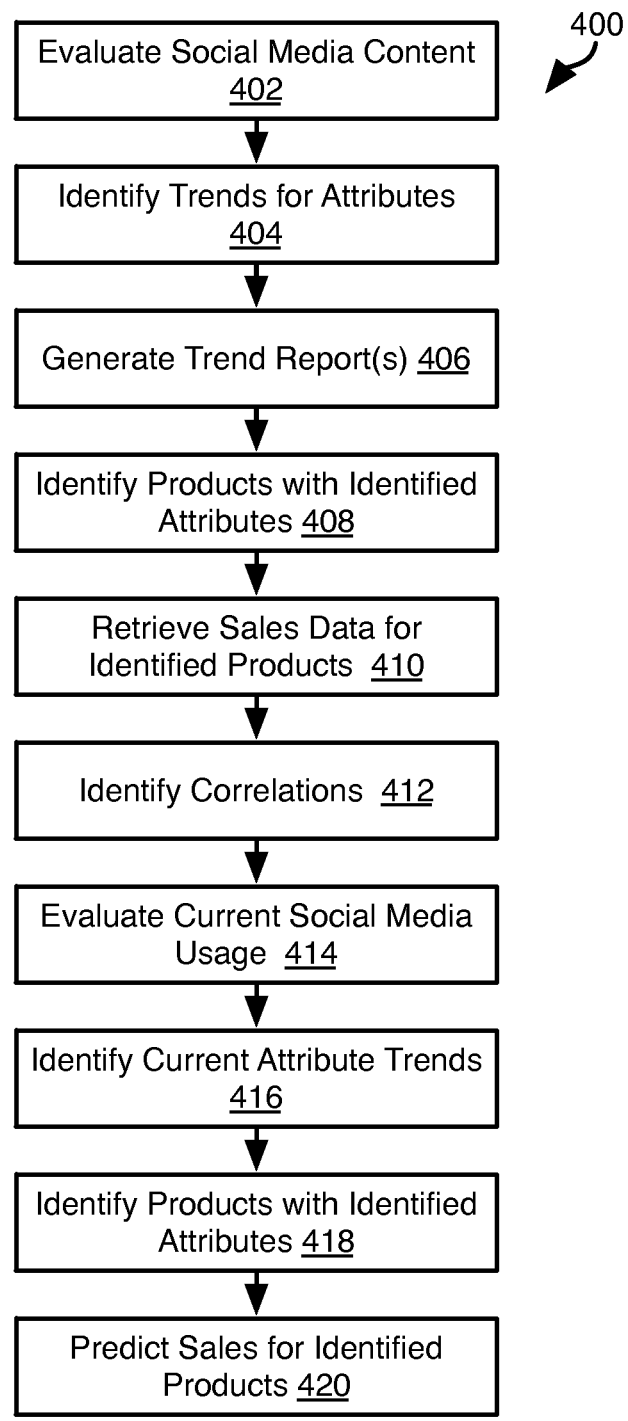
FIG. 4 is a process flow diagram of a method for predicting sales in accordance with an embodiment of the present invention.

Referring to FIG. 4, the illustrated method 400 may be used to use information gathered from social media content, including trends for new concepts identified according to the method 300. The method 400 may include evaluating 402 social media content and identifying 404 trends for attributes. Evaluating 402 may include evaluating social media content for not just products that are popular or of interest, but rather attributes that appear to be currently popular. For example, Pinterest™ allows a user to "pin" articles or images on the Pinterest™ site to indicate a user's interest. Likewise, a user may post images or links to images or articles on Facebook™ site. As an example, images on one or more social media site may be analyzed to identify attributes such as color, texture, shapes, or other image attributes. Identifying 404 trends may include for a particular attribute plotting the frequency over time with which images including that attribute are pinned or posted by users.

In addition to images, trends may be identified 404 in other content. For example, adjectives, color names, recipe ingredients, style references, and the like, in text may indicate a product attributes that are currently popular. A frequency of mention of these attributes may also be identified 404 based on evaluation 402 of social media content.

As for other methods described herein, identifying 404 trends may further include identifying trends for particular groups of users. Users may be grouped by demographic attributes such as age, gender, income, and the like. Users may also be grouped according to geography—city, state, region, country, etc. Groups may be defined as users having multiple attributes, e.g. women living in the west cost or 18-24 year olds living in the south. Trends may then be identified for each group by restricting the identification 404 of trends to content generated by that group.

Trends identified 404 for attributes may be used for various purposes. For example, a trend report may be generated 406. A trend report may include various data regarding the identified trends, such as the top N attributes by volume of postings, the top M attributes that are increasing in frequency of posting, the top Q attributes that were first detected in postings in a recent time window, the top R attributes that had a frequency of posting that first rose above a threshold in a recent time window, or the like. For any of the top N, M, Q, R, etc. attributes a trend report may include one or more representative postings for the attribute or a conversation summary for postings that reference the attribute.

Another aspect of a trend report may be a top S topics that are clustered around the trend. For example, of all the postings related to a trending, the concepts referenced therein may be evaluated. Those that are mentioned the most often in a current window may be listed as part of the report. For example, where the trending topic is the oil spill in the Gulf of Mexico, topics clustered around this concept might include criminal charges against BP, environmental damage, celebrities helping with the cleanup, President Obama visiting the Gulf, the impact on fishing in the Gulf, and the like.

The identified 404 trends for attributes may also be used to identify 408 products having the identified attributes. Identifying products having attributes corresponding to identified 404 trends may include identifying words corresponding to the attributes or synonyms thereof in product descriptions for products in a product catalog. Sales data for the identified 408 products may be retrieved 412 and correlations 412 between sales of the identified 408 products and the identified 404 trends for the attributes of the identified products may be correlated 412. Identifying 412 correlation between the trends and products may be according to any statistical technique known in the art to identify a statistically significant relationship between one event and another. In particular identifying 412 correlations may correlate increases in sales for products having an attribute with an increase in the frequency or volume of mentions of the attribute on one or more social media sites. Identifying a correlation may include identifying 412 between social media trends and product sales for users and stores within a specific geographic region.

Once a correlation has been identified 412, subsequent current social media activity may be evaluated 414 to identify usage of one or more attributes, such as the attributes for which a correlation has been identified 412 with respect to one or more products. In some embodiments, correlations with respect to one class of attribute may be used with respect to different attributes belonging to the same class. For example, if a past trend with respect to color A has been found to correlate to sales of product P having the color A, then this data may be used to anticipate sales of product P having color B when a subsequent trend for color B is detected. Likewise, a correlation between a first attribute and a first product may be used to relate a different second attribute that is of the same class as the first attribute to sales of a second product that is of the same class as the first product.

Accordingly, current trends for attributes may be identified 416 from the evaluation 414 of social media activity and products with the identified attributes may be identified 418. If a product having the identified attributes is a product or belongs to a class of products for which a correlation has been identified 412 between trends and sales, then sales of products having the identified attributes may be predicted based on the correlation. For example, a correlation may relate a frequency of mentions or a rate of increase in the frequency of mentions to sales of a product. Using this relationship, an increase in sales may be predicted 420 given an actually observed frequency of mention of an attribute. This may enable a merchant to select products to sell and to manage inventories in order to avoid running out of products when a trend is uprising or continuing or having too many products when a trend is fading.

As for the other methods disclosed herein, the trends identified and the correlation between trends and sales may be performed for a particular geographic region or for a particular demographic group. That is to say, a correlation between social media trends in a geographic region and sales in the geographic region or a correlation between social media activity by members of a demographic group and sales to the same group. In this manner, although a trends may be fading in one region, it may be rising in another and therefore still be of interest locally.

Figure 5:
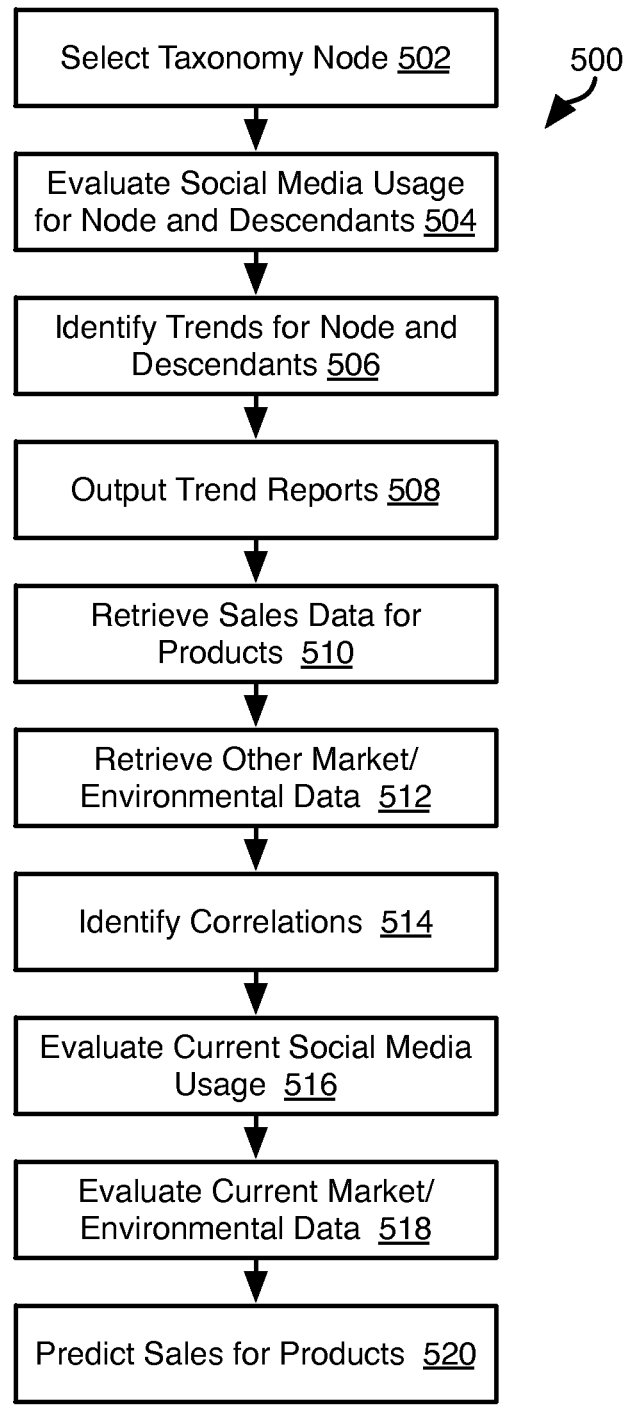
FIG. 5 is a process flow diagram of another method for predicting sales in accordance with an embodiment of the present invention.

FIG. 5 illustrates a method 500 for using social media data with respect to products and classes of products. The method 500 may include selecting 502 a node in a taxonomy. The node may represent a category of products or an actual product and the taxonomy may be a product catalog organized as a hierarchy. Social media usage of the node and its descendants may be evaluated 504. A node in the taxonomy may be identified with a string and may have one or more synonyms or colloquial names. Accordingly, social media postings and documents referenced by such postings may be evaluated 504 to identify references to the node and its descendants nodes, including various forms of representing these nodes. Inasmuch as many terms can have multiple meanings, whether a posting or a document referenced by a posting actually references a node of the taxonomy may be determined using concept extraction according to any method known in the art. For example, the methods for identifying concepts described in U.S. application Ser. No. 13/300,524 may be used.

The method 500 may further include identifying 506 trends for the selected node and its descendants as determined from evaluating 504 the social media content. The identified 506 trends may include a volume or frequency of mentions of the node and its descendants over time. Trends may be compiled for individual nodes of the selected node and its descendants as well as volume or frequency of aggregations of mentions for some or all of these nodes over time. As for other methods described herein, social media content generated by specific demographic groups or from specific geographic regions may be analyzed to identify trends in a similar manner for specific demographic groups or regions.

In some embodiments, or upon request, reports describing trends may be output 508. A trend report may include various data regarding the identified trends, such as the top N nodes of the selected node and its descendants by volume of postings, the top M nodes that are increasing in frequency of posting, the top Q nodes that were first detected in postings in a recent time window, the top R nodes that had a frequency of posting that first rose above a threshold in a recent time window, or the like. For any of the top N, M, Q, R, etc. nodes a trend report may include one or more representative postings for the node or a conversation summary for postings that reference the node.

The method 500 may further include retrieving 510 sales data for products corresponding to the selected node and descendant nodes. The method 500 may further include retrieving 512 one or more other market or environmental data. Any correlations may be identified 514 between the identified 506 trends and the sales data and one or more market or environmental data. In some embodiments, only correlations between sales data and social media trends are identified 514. Examples of environmental and market data that may be correlated with sales data along with social media trends include local weather conditions, sporting and other events, holidays, market indicators or indexes, stock prices, and the like. Correlations 514 may be identified between the social media trends and any other factors and the product sales using any statistical method known in the art.

Correlations may be identified for sales of products corresponding to individual nodes with respect to references to that node in social media content. Correlations may also be identified between sales of classes of products represented by a group of nodes and social media trends and zero or more other factors. In a like manner, the entire method 500 may be executed with respect to an individual node, e.g. one product, rather than a node and its descendants.

The correlations identified 514 between sales data and one or both of social media activity and other factors may be used to predict future sales. To do this, subsequent current social media usage for a node, or a node and its descendants, of the taxonomy may be evaluated 516. Evaluating 516 may include identifying references to the node, or the node and its descendants, for one or more social media sites with respect to time in a particular time window. In particular, trends, including a frequency of mentions per unit time and the like, may be calculated according to the evaluation 516.

The trends determined according to the evaluation 516 may then be evaluated with respect to the identified 514 correlations to predict 520 further sales of a product, or class of products, corresponding to a node. In instances where a correlation takes into account one or more environmental or market conditions, the current state of these may be evaluated 518 in order to predict 520 future sales in accordance with the correlation.

As noted above, correlations may be made with respect to a class of products such that no correlation specific to a product need to be made in order to make a prediction for sales. A correlation for the class of products may be used in conjunction with current trends relating to a product belonging to that class in order to predict sales for that product. In some instances, no correlation exists between a class of products and social media data. Accordingly, the method 500 may include reporting this fact in lieu of predicting 520 future sales.

Figure 6:
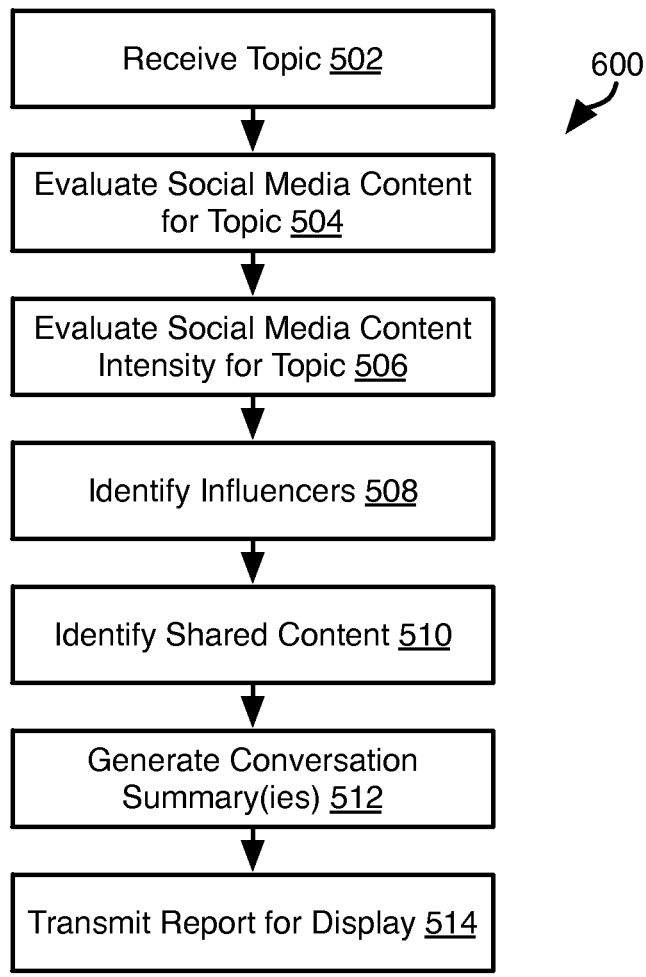
FIG. 6 is a process flow diagram of a method for reporting social media data in accordance with an embodiment of the present invention.

FIG. 6 illustrates a method 600 for generating reports on social media trends, such as trends identified according to any of the foregoing methods. The method 600 may include receiving 502 a topic. Receiving 502 a topic may include receiving the topic as a query. A topic may also be received as a request for alerts when trends are detected in social media with respect to the topic. Social media content for the topic may be evaluated 504. Evaluating 504 social media content may include using a taxonomy to identify concepts related to the received topic and performing concept extraction with respect to social media content, as discussed above, to identify mentions relating to the received topic in the social media content. Identifying concepts related to the received topic using a taxonomy may include identifying descendent nodes of the node corresponding to the received topic in the taxonomy as concepts to be monitored. Evaluating 504 may further include identifying trends for concepts, groups of concepts, and the received topic in social media data, such as the number of mentions over time of these entities.

In addition to evaluating trends and a number of mentions relating to a topic, in some embodiments, the method 500 may include evaluating 506 an intensity expressed in social media content relating to the received topic 502. Various metrics may be used to characterize intensity. In particular, words or phrases that express emotion may be noted and may be further scored to provide a weight reflecting the intensity of emotion. Intensity of discussion of a topic may be measured as a sum of the weights of emotionally charged words that occur in social media content relating to the received topic in a given time interval. A plot of this measure of intensity may then be used to indicate the rise and fall of intensity of interest with respect to a topic.

The method 500 may further include identifying influencers 508 with respect to a topic. Identifying 508 influencers with respect to a topic may include performing the same methods described above with respect to identifying 304 second tier influencers. In particular, an influencer with respect to a topic may be one with influence according to any of the metrics discussed above and that has a relatively large amount of postings relating to the received topic. In some embodiments, only influence of a user with respect to the received topic is counted when identifying 508 influencers. Accordingly, in such embodiments, only repostings by other users, for example, of a user's postings that relate to the received topic may be used to measure a user's influence.

The method 500 may further include identifying 510 shared content. Shared content may include images, web-sites, documents, and text, that are shared with high frequency in social media content relating to the received topic. For example, for a given time window, e.g. the most recent N days, the number of posts on one or more social media sites referencing a web site, image, video, text, or the like may be counted. That content that is referenced the most, e.g. the content with the top M number of postings may be identified 510 as important shared content for the received topic.

The method 500 may further include generating 512 conversation summaries relating to the received topic. For example, among postings identified as relating to the received topic in a given time window those words or phrases that are most commonly used may be identified. One or more exemplary postings, or series of postings, that include these words may be identified and used as a summary of conversations relating to the topic.

The data generated according to the steps 504-512 may be formatted into a report and transmitted 514 to display to a user. Where a user has requested an alert, the report may be transmitted to a user's email account or some other data store for viewing when the user is available. Where the method 500 was performed on demand, the report may be returned to the user through an interface, such as a web site, through which the user requested the report.

The methods disclosed in the figures and the foregoing discussion may be used in many contexts. For example, popular movies are often released along with many types of merchandise. A correlation between a movie and sales of products relating to the movie may be used to predict sales for a different movie. For example, sales of "Batman" related merchandise may be correlated to social media activity with respect to "Dark Knight Rises" could be used to predict sales of "Avengers" related merchandise based on a frequency or volume of social media content relating to "The Avengers" movie.

As another example, geographic social media trends for mentions of a product may be used to generate a heat map reflecting level of interest for the product at different locations or regions. A buyer for a store may then use geographically focused metrics of interest to anticipate demand for the product and buy and appropriate amount.

The methods disclosed herein may be used to allow a user to sign up for alerts relating to a category such as "vitamins" or "dietary supplements" and receive alerts for trends in these categories that indicate an increase in interest. In particular, trends identified for new concepts using content generated by an expert pool according to the method 300 may be used to generate alerts. In some embodiments, alerts may be generated when a new trend achieves a volume or frequency of mentions that exceeds a threshold. For example, if a supplement "raspberry ketone" is trending and achieves a threshold level of popularity, the user may receive an alert reporting this trend.

In another example, a user may observe an unexplained trend in a report generated according to methods disclosed herein. However, a report as generated herein may include conversation summaries that may include the text of postings relating to the top trends for the topic of the report. A user may therefore deduce an event or cultural phenomenon that is giving rise to the trend.

Another example, includes the use of environmental factors such as the weather. As noted with respect to the method 500 a correlation may be identified for one or both of social media activity and market and environmental factors. As an example, a search for "Umbrellas" using the illustrated methods may be used to retrieve a correlation between weather forecasts or actual weather and sales of umbrellas. Future sales of umbrellas in view of current weather conditions may then be predicted using this correlation. Of course, other correlations between products and market or environmental conditions may also be used to predict sales, either alone or in combination with social media trends as discussed with respect to the method 500.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for trend detection, the method comprising:
receiving, by a computer system, a seed expert set, the seed expert set comprising expert contributors to social media content with respect to a category;
identifying, by the computer system, a second tier set, the second tier set comprising highly influential users with respect to the social media content with respect to the category from the seed expert set;
identifying, by the computer system, new concepts in the social media content with respect to the category generated by at least one of the seed expert set or the second tier set, identifying the new concepts comprises maintaining a record for at least a portion of the social media content generated by at least one of the seed expert set or the second tier set for a window of time;
monitoring, by the computer system, trends for the new concepts in activity of a general population of social media users; and
outputting, by the computer system, a representation of at least a portion of the trends for the new concepts;
wherein:
identifying the new concepts further comprises comparing the social media content generated by the at least one of the seed expert set or the second tier set to the record for at least the portion of the social media content generated by at least one of the seed expert set or the second tier set for the window of time; and
the window of time comprises a set period of time minus a current time.

2. The method of claim 1, wherein monitoring, by the computer system, the trends for the new concepts in the activity of the general population of social media users further comprises at least one of:
detecting local trends in accordance with a location of users in the general population of social media users; or
detecting demographic trends in accordance with demographic attributes of users in the general population of social media users.

3. The method of claim 1, wherein monitoring, by the computer system, the trends for the new concepts in the activity of the general population of social media users further comprises characterizing intensity of interest expressed among the general population of social media users for the new concepts.

4. The method of claim 1, further comprising generating a report for the activity of the general population of social media users relating to one or more of the new concepts.

5. The method of claim 4, wherein the report includes at least one conversation summary for a portion of the activity relating to the one or more of the new concepts.

6. The method of claim 5, wherein the report includes a volume graph for the portion of the activity relating to the one or more of the new concepts.

7. The method of claim 5, further comprising generating, by the computer system, an alert in accordance with the trends for the new concepts.

8. The method of claim 1, further comprising generating a correlation between the trends for the new concepts and sales of at least one of a product, products having a common attribute, or a class of products.

9. The method of claim 1, wherein: the set period of time is six months; and the current time is three days.

10. A system for trend detection, the system comprising one or more processors and one or more memory devices operably coupled to the one or more processors, the one or more memory devices storing executable and operational data effective to cause the one or more processors to:
   receive a seed expert set comprising expert contributors to social media content with respect to a category;
   identify a second tier set comprising highly influential users with respect to the social media content with respect to the category from the seed expert set;
   maintain a record for a least a portion of the social media content generated by at least one of the seed expert set or the second tier set for a window of time;
   identify new concepts in the social media content with respect to the category generated by at least one of the seed expert set or the second tier set;
   monitor trends for the new concepts in activity of a general population of social media users; and
   output at least a portion of the monitored trends for the new concepts;
   wherein:
      the one or more memory devices storing the executable and operational data effective to cause the one or more processors to identify the new concepts further comprises comparing the social media content generated by the at least one of the seed expert set or the second tier set to the record for at least the portion of the social media content generated by at least one of the seed expert set or the second tier set for the window of time; and
      the window of time comprises a set period of time minus a current time.

11. The system of claim 10, wherein the executable and operational data are further effective to cause the one or more processors to monitor for the new concepts in the activity of the general population of social media users by at least one of:
   detecting local trends in accordance with a location of users in the general population of social media users; or
   detecting demographic trends in accordance with demographic attributes of users in the general population of social media users.

12. The system of claim 10, wherein the executable and operational data are further effective to cause the one or more processors to monitor trends for the new concepts in the activity of the general population of social media users by characterizing intensity of interest expressed among the general population of social media users for the new concepts.

13. The system of claim 10, wherein the executable and operational data are further effective to cause the one or more processors to generate a report for the activity of the general population of social media users relating to one or more of the new concepts.

14. The system of claim 13, wherein the report includes at least one conversation summary for a portion of the activity relating to the one or more of the new concepts.

15. The system of claim 14, wherein report includes a volume graph for the portion of the activity relating to the one or more of the new concepts.

16. The system of claim 14, wherein the executable and operational data are further effective to cause the one or more processors to generate an alert in accordance with the trends for the new concepts.

17. The system of claim 10, wherein the executable and operational data are further effective to cause the one or more processors to generate a correlation between the trends for the new concepts and sales of at least one of a product, products having a common attribute, or a class of products.

18. The system of claim 10, wherein: the set period of time is six months; and the current time is three days.

* * * * *